United States Patent
Yoshihara et al.

(10) Patent No.: US 6,800,685 B1
(45) Date of Patent: Oct. 5, 2004

(54) POLYESTER RESIN COMPOSITION FOR ENGINE PERIPHERAL PARTS

(75) Inventors: Nori Yoshihara, Otsu (JP); Satoshi Kosugi, Otsu (JP); Kenjiro Ogami, Nagoya (JP); Hidehiro Nakamura, Nagoya (JP); Yutaka Ogasawara, Hashima (JP); Masahiro Ogata, Nishikasugai-gun (JP); Satoru Watanabe, Kasugai (JP); Junji Koizumi, Nagoya (JP)

(73) Assignees: Toyo Boseki Kabushiki Kaisha, Osaka (JP); Toyoda Gosei Co., Ltd., Nishikasugai-gun (JP)

( * ) Notice: Subject to any disclaimer, the term of this patent is extended or adjusted under 35 U.S.C. 154(b) by 794 days.

(21) Appl. No.: 09/590,814

(22) Filed: Jun. 9, 2000

(30) Foreign Application Priority Data

| Jun. 11, 1999 | (JP) | 11-165355 |
| May 24, 2000 | (JP) | 2000-152965 |
| May 18, 2000 | (JP) | 2000-145903 |

(51) Int. Cl.⁷ ................................................ C08K 3/34

(52) U.S. Cl. .................... 524/451; 525/191; 525/240
(58) Field of Search ...................... 524/451; 525/191, 525/240

(56) References Cited

U.S. PATENT DOCUMENTS

| 3,769,260 A | * 10/1973 | Segal ........................ 524/494 |
| 4,215,032 A | 7/1980 | Kobayashi et al. |
| 5,399,605 A | * 3/1995 | Yoshihara et al. .......... 524/377 |

\* cited by examiner

Primary Examiner—William K. Cheung
(74) Attorney, Agent, or Firm—Kenyon & Kenyon

(57) ABSTRACT

The present invention provides a polyester resin composition for engine peripheral parts, the resin composition comprising at least one polymer selected from the group consisting of polyethylene terephthalate and an ethylene terephthalate copolymer; an inorganic reinforcement material; and an olefin polymer, wherein a molded article produced from the resin composition has a flexural strain at break of 3.5% or higher and a deflection temperature under load of 180° C. or higher.

4 Claims, No Drawings

POLYESTER RESIN COMPOSITION FOR ENGINE PERIPHERAL PARTS

TECHNICAL FIELD

The present invention relates to a polyester resin composition for engine peripheral parts, especially to a polyester resin composition suitable for the engine peripheral parts of transport vehicles such as automobiles and motorcycles.

BACKGROUND ART

A cowling, among other engine peripheral parts, disposed at the upper portion of an engine is used for preventing engine from contacting with wires and pipes and for insulating noise and also serves as an emblem of the engine.

Conventionally, engine peripheral parts for transport vehicles such as automobiles and motorcycles are made of polypropylene resins, polyamide resins or like synthetic resins. Engine peripheral parts made of the polypropylene resins, among the above resins, may melt or be deformed because of their poor heat resistance in case that the engine space of the vehicle is compactly designed. The engine peripheral parts made of the polyamide resins undergo changes in their size when they absorb water during their use. Thus, such parts can only be mounted at limited positions. The engine peripheral parts may also be discolored because the temperature inside the engine space may be raised to 120° C. or higher.

DISCLOSURE OF INVENTION

A primary object of the present invention is to solve the problems of conventional resin compositions for engine peripheral parts by providing a polyester resin composition which is suitable for producing engine peripheral parts, the composition having good moldability and being capable of providing a molded article having good appearance, high impact resistance, light weight, high heat resistance, high warpage resistance, high noise insulation property, and high resistance to discoloration caused by heat and to change in size caused by water absorption.

The inventors of the present invention conducted extensive research to achieve the above-mentioned object. Consequently, the inventors found that the aforementioned objected could be achieved by a resin composition which is prepared by mixing polyethylene terephthalate or an ethylene terephthalate copolymer as a polyester resin with a specific amount of an inorganic reinforcement material and an olefin polymer, the resin composition providing a molded article having flexural strain at break and deflection temperature under load in specific ranges. The present invention was accomplished based on this finding.

The present invention provides the following polyester resin compositions:

1. A polyester resin composition for engine peripheral parts, the resin composition comprising:
(A) 60–92% by weight of at least one polymer selected from the group consisting of polyethylene terephthalate and an ethylene terephthalate copolymer;
(B) 5–15% by weight of talc; and
(C) 3–25% by weight of an olefin polymer,
wherein a molded article produced from the resin composition has a flexural strain at break of 3.5% or higher and a deflection temperature under load of 180° C. or higher.

2. A polyester resin composition for engine peripheral parts, the resin composition comprising:

(A) 100 parts by weight of at least one polymer selected from the group consisting of polyethylene terephthalate and an ethylene terephthalate copolymer;
(B) 5–70 parts by weight of an inorganic reinforcement material;
(C) 2–20 parts by weight of an ethylene polymer having a melt flow rate of 5 or lower; and
(D) 3–20 parts by weight of a propylene polymer having a melt flow rate of 5–100,
wherein a molded article produced from the resin composition has a flexural strain at break of 3.5% or higher and a deflection temperature under load of 180° C. or higher.

3. The polyester resin composition for engine peripheral parts according to item 1 or 2, wherein at least one polymer selected form the group consisting of polyethylene terephthalate and an ethylene terephthalate copolymer contains germanium.

The polyester resin to be contained in the resin composition of the present invention is at least one polymer (this polymer may be hereinafter simply referred to as "polyester resin" in the present specification) selected from the group consisting of polyethylene terephthalate and an ethylene terephthalate copolymer.

For preparing the ethylene terephthalate copolymer, may be used conventionally known glycol components, in addition to ethylene glycol, such as polypropylene glycol, butanediol, hexamethylene glycol, neopentyl glycol, cyclohexane dimethanol, diethylene glycol, polyethylene glycol, polytetramethylene glycol and polylactone. As the acid component, in addition to terephthalic acid may be used conventionally known acid components, e.g., naphthalene dicarboxylic acid, isophthalic acid, adipic acid and sebacic acid. The ethylene terephthalate copolymer to be used in the present invention can be prepared by copolymerization of the above glycol components and acid components. When copolymerizable monomer(s) other than ethylene glycol and terephthalic acid is excessively used, the heat resistance and crystallizability of the ethylene terephthalate copolymer is lowered. Therefore, the amount of the copolymerizable monomer(s) other than ethylene glycol and terephthalic acid is preferably 20 mol % or lower of the total monomer components.

The polyester resin preferably has a weight average molecular weight of about 15,000 to about 50,000.

In the present invention, the polyester resins prepared by polymerization using a germanium-containing catalyst are preferable in terms of commercial values since they have an attractive deep color. In this case, the amount of germanium is preferably about 1 ppm to about 500 ppm as a germanium metal relative to the polyester resins.

Recycled resins as of PET bottles can also be used as the polyester resin for the resin composition. However, because these polyester resins are often designed to have high molecular weights, they may have low crystallizability and fluidity and thus may not be suitable for injection molding.

Specific examples of the resin compositions which can achieve the object of the invention include a polyester resin composition (this resin composition is hereinafter referred to as "resin composition A") comprising: (A) 60 to 92% by weight of at least one polymer (polyester resin) selected from the group consisting of polyethylene terephthalate and an ethylene terephthalate copolymer; (B) 5 to 15% by weight of talc; and (C) 3 to 25% by weight of an olefin polymer. In this case, the proportion of each component is based on 100% by weight of the polyester resin composition including additive components which are optionally contained therein.

The amount of the polyester resin to be contained in the resin composition A is about 60–92% by weight, preferably about 60–90% by weight, more preferably about 70–90% by weight.

The talc to be contained in the resin composition A is in a form of a plate. Use of a small amount of the talc can improve the dimensional stability of engine peripheral parts and the appearances of molded articles. Therefore, talc is a reinforcement material suitable for the object of the present invention. The amount of the talc to be contained in the resin composition A is about 5–15% by weight, preferably about 5–10% by weight. When the content of talc in the resin composition is too low, dimensional stability and rigidity at high temperatures are lowered. When the content of talc is too high, impact resistance is lowered and the weight of the engine peripheral parts increases, disadvantageously lowering the fuel efficiency of the transport vehicle.

The resin composition A may contain glass beads, silica, mica, calcium carbonate, wollastonite, kaolin, clay, glass fiber, carbon fiber and like inorganic reinforcement materials in addition to talc. In order to improve adhesiveness between these reinforcement materials and the polyester resin and increase strength and impact resistance of the engine peripheral parts, a silane coupling agent, titanate coupling agent or the like can be used.

As the olefin polymer to be contained in the resin composition A is used at least one polymer selected from the group consisting of polyolefin and olefin copolymer. The content of the olefin polymer in the resin composition A is about 3–25% by weight, preferably about 4–15% by weight. When the content of the olefin polymer in the resin composition A is too low, the impact resistance of the engine peripheral parts is hardly improved. When the content is too high, rigidity and heat resistance of the engine peripheral parts is unfavorably lowered.

As the olefin polymer may be used polyethylene, polypropylene, polybutene and like poly-α-olefins; ethylene-propylene copolymer, ethylene-propylene-diene copolymer, ethylene-butylene copolymer, ethylene-ethyl acrylate copolymer, ethylene-vinyl acetate copolymer, ethylene-methyl methacrylate copolymer and like olefin copolymers; copolymer of the above polyolefin or olefin copolymer with methacrylic acid, acrylic acid, metal salt of methacrylic acid, acrylic acid or the like; maleic anhydride-modified form of the above polyolefin or olefin copolymer; and epoxy-modified form of the above polyolefin or olefin copolymer. Among these, particularly preferable are polyolefin-methacrylic acid copolymer, polyolefin-salt of methacrylic acid copolymer, maleic anhydride-modified form of polyolefin or olefin copolymer and epoxy-modified form of polyolefin or olefin copolymer. The olefin polymers can be used singly or in combination of two or more kinds. The amount of copolymerizable monomer(s) other than olefin monomer in the olefin polymer is preferably 40 mol % or lower, more preferably 35 mol % or lower, based on the total amount of monomers.

Further, it is essential that a molded article produced by injection-molding of the resin composition A has a flexural strain at break of 3.5% or higher, and a deflection temperature under load of 180° C. or higher.

A flexural strain at break is a value determined by the following method.

A test piece (13 mm×6.4 mm×127 mm) is produced by injection molding at the resin temperature of 270° C. and the mold temperature of 120° C. The test piece is subjected to a flexural test according to ASTM-D-790 at 23° C. and the strain of the outermost layer of the test piece is calculated based on the degree of the test piece deflection when broken. The calculated strain is the value of a flexural strain at break (%).

The deflection temperature under load is a temperature (° C.) determined under a load of 0.46 MPa according to ASTM-D-648 using a test piece (13 mm×6.4 mm×127 mm) produced by injection molding under the same conditions as in the above.

The polyester resin composition for the engine peripheral parts needs to have conflicting properties, i.e., heat distortion resistance and rigidity as well as impact resistance. Heat distortion resistance and rigidity can be improved by adding inorganic reinforcement material to the resin composition. However, the molded article produced from such composition is so rigid and brittle that it is broken by drop test. The impact resistance of the molded article can be improved by finely dispersing a flexible resin having an affinity for the polyester resin in the polyester resin composition. However, the molded article produced from such polyester resin composition has impaired rigidity and heat distortion resistance. Further, the combined use of the inorganic reinforcement material and the flexible resin may result in counteraction of the respective effects and impaired properties. Therefore, the polyester resin composition can not have heat distortion resistance and rigidity as well as impact resistance coincidentally, exhibiting unpractical performance. However, it was found that if the molded article has both of a deflection temperature under a light load of 180° C. or higher and a flexural strain at break of 3.5% or higher, the molded article has satisfactory performance for use as engine peripheral parts. This range of each characteristic value can be achieved by adding talc and olefin polymer to the polyester resin in a specific proportion. It is still unknown why the characteristic values of the molded article produced from the resin composition A fall within this range. It is presumably because the polyester resin for use in the present invention has a high affinity for talc and the olefin polymer, and a special synergistic effect is produced by well-balanced affinity of the components.

The resin composition capable of achieving the object of the present invention may also be, for example, a polyester resin composition (hereinafter referred to as "resin composition B") comprising:

(A) 100 parts by weight of at least one polymer (polyester resin) selected from the group consisting of polyethylene terephthalate and an ethylene terephthalate copolymer;
(B) 5–70 parts by weight of an inorganic reinforcement material;
(C) 2–20 parts by weight of an ethylene polymer having a melt flow rate of 5 or lower; and
(D) 3–20 parts by weight of a propylene polymer having a melt flow rate of 5–100.

The resin composition B may contain, as the polyester resin, those useful for the above resin composition A.

The amount of the inorganic reinforcement material to be contained in the resin composition B is about 5–70 parts by weight, preferably about 10–50 parts by weight, more preferably about 10–30 parts by weight, based on 100 parts by weight of the polyester resin. When the content of the inorganic reinforcement material is too low, dimensional stability and rigidity at high temperatures are lowered. When the content of the inorganic reinforcement material is too high, the impact resistance is lowered and the unit weight of the engine peripheral parts is increased, resulting in lowered fuel efficiency of the transport vehicles. Preferable inorganic reinforcement materials are talc, glass beads, silica, mica, calcium carbonate, wollastonite, kaolin, clay, glass fiber, carbon fiber and the like in view of providing the molded article with dimensional stability and good appearance in small amounts. These materials can be used singly or in combinations, among which the combination of talc and glass fiber is particularly preferable. When using talc and glass fiber in combination, the weight ratio of talc:glass fiber is preferably about 1:9 to about 8:2. Further, in order to improve the strength and impact resistance of the molded article by increasing the adhesiveness between these inorganic reinforcement materials and the polyester resin, a silane coupling agent, titanate coupling agent or the like may be used.

The resin composition B contains an ethylene polymer having a melt flow rate of 5 or lower and a propylene polymer having a melt flow rate of 5–100.

The resin composition B contains the ethylene polymer having a melt flow rate of 5 or lower in an amount of about 2–20 parts by weight, preferably about 3–15 parts by weight, based on 100 parts by weight of the polyester resin. When the content of the ethylene polymer in the resin composition B is too low, the impact resistance of the molded article is hardly improved. On the other hand, when the content of the ethylene polymer is too high, the rigidity and heat resistance are disadvantageously lowered. When the melt flow rate of the ethylene polymer is higher than 5, the impact resistance can be hardly improved.

Useful ethylene polymers include polyethylene; ethylene-propylene copolymer, ethylene-propylene-diene copolymer, ethylene-butylene copolymer, ethylene-ethyl acrylate copolymer, ethylene-vinyl acetate copolymer, ethylene-methyl methacrylate copolymer and like ethylene copolymers; copolymer of the above polyethylene or ethylene copolymer with methacrylic acid, acrylic acid, metal salt of methacrylic acid acrylic acid or the like; maleic anhydride-modified form of the above polyethylene or ethylene copolymer; and epoxy-modified form of the above polyethylene or ethylene copolymer. Among them, particularly preferable are ethylene-methacrylic acid copolymer, ethylene-salt of methacrylic acid copolymer, maleic anhydride-modified form of polyethylene or ethylene copolymer and epoxy-modified form of polyethylene or ethylene copolymer. The ethylene polymers can be used singly or in combination of two or more kinds. The ethylene polymer preferably contains copolymerizable monomer(s) other than ethylene in an amount of 40 mol % or lower, more preferably 35 mol % or lower, based on the total amount of monomers.

The content of the propylene polymer having a melt flow rate of 5–100 in the resin composition B is about 3–20 parts by weight, preferably about 5–10 parts by weight, based on 100 parts by weight of the polyester resin. The preferable propylene polymers are polypropylene; propylene-butylene copolymer, propylene-ethyl acrylate copolymer, propylene-methyl methacrylate copolymer and like propylene copolymers; copolymer of the above polypropylene or propylene copolymer with acrylic acid, methacrylic acid, salt of methacrylic acid or the like; maleic anhydride-modified form of the above polypropylene or propylene copolymer; and epoxy-modified form of the above polypropylene or propylene copolymer. The content of copolymerizable monomer(s) other than propylene in the propylene polymer is preferably 40 mol % or lower, more preferably 35 mol % or lower, based on the total amount of monomers.

When the propylene polymer has a melt flow rate of lower than 5, the fluidity and mold releasing property of the resin composition are lowered and thus continuous molding is made difficult. When the propylene polymer has a melt flow rate of higher than 100, the flow marks tend to occur on the surface of the molded article, degrading the commercial value of the molded article. In general, when a polyester resin having a high melt viscosity is used, the poor fluidity of the resin composition makes molding operation difficult. However, the specific combination of the polymers mentioned in the above can impart high fluidity to the resin composition even if it contains a polyester resin having a high melt viscosity, enabling to provide large molded articles. A propylene polymer having a low melt viscosity is in a highly fluid state during melt molding, whereas it is rigid as a molded article. Thus, such propylene polymer is effective and favorable for achieving the object of the present invention.

It is essential for the resin composition B, as well as for the resin composition A, that the molded article of the resin composition B produced by injection molding has a flexural strain at break of 3.5% or higher and deflection temperature under load of 180° C. or higher. The flexural strain at break and deflection temperature under load are determined by the same method as that of the resin composition A.

The resin composition B has heat distortion resistance and rigidity as well as impact resistance coincidentally when its molded article have a flexural strain at break of 3.5% or higher and deflection temperature under load of 180° C. or higher, and thus satisfies the required properties for the engine peripheral parts, as is the case with the resin composition A. The reason why the resin composition B can attain such properties is still unclear. It is, however, presumed that by containing an ethylene polymer having a melt flow rate of 5 or lower, a propylene polymer having a melt flow rate of 5–100 and an inorganic reinforcement material in a specific proportion, a synergistic effect is produced between the inorganic reinforcement material preventing distortion upon impact and the ethylene polymer serving as an impact absorber. In addition, the propylene polymer having a low melt viscosity contained in the resin composition B lowers the flow resistance of the resin composition against the surface of a mold. Accordingly, the resin composition B obtains high fluidity without losing impact resistance.

For the resin composition used for producing the engine peripheral parts, especially the large parts having a cross section of 1000 $cm^2$ or greater as of automobiles and like vehicles, high fluidity is necessary as well as heat distortion resistance, rigidity, impact resistance, etc. Since the resin composition B satisfies all of these characteristic demands, it can be suitably used even as the resin composition for producing large parts.

The polyester resin compositions for the engine peripheral parts of the present invention may optionally contain conventional additives such as heat stabilizers, weather resistant agents, anti-hydrolysis agents, pigments, etc. Examples of the heat stabilizers include hindered phenol compounds, thioether compounds, phosphate compounds and the mixtures thereof. Examples of the weather resistant agents include carbon black, benzophenone compounds, triazole compounds, hindered amine compounds and the like. Examples of anti-hydrolysis agent include carbodiimide, bisoxasolin, epoxy compounds, isocyanate compounds and the like. Useful as the pigment are heat-resistant pigments conventionally used for the compositions containing polyester resins as resin components, among others.

The polyester resin compositions for the engine peripheral parts of the present invention can be prepared by kneading the aforementioned components with a monoaxial extruder, biaxial extruder, kneader or like apparatuses. The types of the kneader and kneading conditions are not critical.

The method for molding the polyester resin composition for engine peripheral parts of the present invention is not limited, and may be generally injection molding method. The configurations of the engine peripheral parts are not critical, and may be of any shapes designed as desired, for example, box-shape and cap-shape. The obtained engine peripheral parts may be optionally colored by mass pigmentation, that is, addition of pigments to the materials to be molded or by coating, or may be printed by hot-stamping or screen printing. The engine peripheral parts are attached to the engine or the like with bolts or by like means.

The engine peripheral parts produced from the polyester resin compositions of the present invention are not particularly limited. Examples of the engine peripheral parts include cowlings, cylinder head covers, air intake pipes, oil pans, timing belt covers, intake manifold, filler caps, throttle bodies, cooling fans and the like. In particular, the polyester resin composition for engine peripheral parts of the present invention can be characteristically used even as a molding material for producing large parts such as cowlings.

According to the present invention, it is possible to obtain a polyester resin composition for engine peripheral parts which have good moldability, good appearance, impact resistance, lightweight property, heat resistance, warp resistance and noise insulation property, and are unlikely to undergo discoloration cased by heat or dimensional changes cased by water absorption.

EXAMPLES

The present invention is described below in further details with reference to Examples.

Examples 1–24 and Comparative Examples 1–12

The ingredients of Examples and Comparative Examples were weighed and premixed in the mixing ratio (% by weight) shown in Table 1 and Table 2. Each premixture was fed into the hopper of the co-rotating twin-screw extruder measuring 30 mm φ in diameter. The cylinder temperature of the extruder was adjusted to 265–270–270° C. from the hopper side. The mixture was melted and kneaded with screw rotation at 100 rpm, giving pellets. The resulting pellets were dried at 140° C. for 3 hours. Test pieces for physical characteristics evaluation were prepared from the pellets by using an injection molding machine which was adjusted to have a cylinder temperature of 260–265–265° C. and a mold having a surface temperature of 120° C. The physical characteristics of the test pieces were evaluated. The results are shown in Table 1 and Table 2.

The physical properties of the test pieces were evaluated by the following methods:

1) Flexural Strain at Break

Test pieces (13 mm×6.4 mm×127 mm) were prepared by injection molding at a resin temperature of 270° C. and a mold temperature of 120° C. The test pieces were subjected to a flexural test according to ASTM-D-790 under the circumstances of a temperature of 23° C. and 50% RH, and load-deflection was automatically recorded. Based on the deflection d (mm) when the test piece was broken, the flexural strain at break(γ) was determined by the following equation:

$$\gamma(\%) = 600 t d / L^2$$

t: thickness (mm), L: span (mm)

2) Deflection Temperature Under Load

Test pieces (13 mm×6.4 mm×127 mm) were prepared by injection molding under the same conditions as those of the above flexural strain test. The test pieces were tested by a heat distortion tester equipped with an automatic heat riser according to ASTM-D648 under the circumstances of a temperature of 23° C. and 50% RH with the application of a load of 0.46 MPa.

3) Impact Resistance

Box-shaped molded articles (400 mm×550 mm×80 mm; thickness: 2 mm) produced by injection molding were dropped from a height of 1 m at −30° C. The results are indicated with A when the molded article was not broken, or with B when the molded article was broken.

4) Heat Resistance

Box-shaped molded articles (400 mm×550 mm×80 mm; thickness: 2 mm) produced by injection molding were heated at 120° C. for 7 days. The results are indicated with A when no deformation or warpage was found on the molded article, or with B when deformation or warpage was found on the molded article.

5) Appearance

Box-shaped molded articles (400 mm×550 mm×80 mm; thickness: 2 mm) produced by injection molding were checked for their flow marks, weld lines, luster, burning and warpage, and were rated on a scale of "A" to "C". "A" means that it has the most excellent appearance.

In Tables, the following abbreviations are used:

PET I: Pulverized recycled PET bottles (Ge content: 50 ppm)

PET II: Polyethylene terephthalate (weight average molecular weight: about 25,000, Ge content: 50 ppm)

PET III: Polyethylene terephthalate (weight average molecular weight: about 40,000, Ge content: 50 ppm)

Talc: Talc (average particle diameter: about 5 µm)

Calcium carbonate:
  Calcium carbonate (average particle diameter: 2 µm)

Wollastonite:
  Wollastonite (average particle diameter: 8 µm)

Silica: Silica (average diameter: 2 µm)

Glass fiber:
  Glass fiber (average diameter: 10 µm, length: 3 mm)

Glass beads:
  Glass beads (average particle diameter: 30 µm)

E/MAH: Ethylene-maleic anhydride copolymer

E/P/MAH: Ethylene-propylene-maleic anhydride copolymer

E/GMA: Ethylene-glycidyl methacrylate copolymer

E/GMA/AS: Acrylonitrile-styrene adduct of ethylene-glycidyl methacrylate copolymer E/EEA/MAH: Ethylene-ethyl acrylate-maleic anhydride copolymer E/EEA/GMA: Ethylene-ethyl acrylate-glycidyl methacrylate copolymer E/MMA/MAA: Ethylene-methyl methacrylate-methacrylic acid copolymer E/MMA/MAA/Na: Ethylene-methyl methacrylate-Na salt of methacrylic acid copolymer E/MMA/MAA/Zn: Ethylene-methyl methacrylate-Zn salt of methacrylic acid copolymer E/EEA: Ethylene-ethyl acrylate copolymer E/P: Ethylene-propylene copolymer P/MAH: Polypropylene modified with maleic anhydride PE: Polyethylene PP: Polypropylene ABS: Acrylonitrile-butadiene-styrene copolymer MBS: Methyl methacrylate-butadiene-styrene copolymer SEBS: Hydrogenated styrene-butadiene copolymer TPU: Thermoplastic polyurethane

TABLE 1

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Polyester resin composition | | | | | | | | | | | | |
| PET I | 80 | 80 | 80 | 80 | 80 | 80 | 80 | 80 | 80 | 80 | 80 | 80 |
| PET II | | | | | | | | | | | | |
| PET III | | | | | | | | | | | | |
| Talc | 10 | 10 | 10 | 10 | 10 | 10 | 10 | 10 | 10 | 10 | 10 | 10 |
| Calcium carbonate | | | | | | | | | | | | |
| Wollastonite | | | | | | | | | | | | |
| Silica | | | | | | | | | | | | |
| Glass fiber | | | | | | | | | | | | |
| Glass beads | | | | | | | | | | | | |
| E/MAH | 10 | | | | | | | | | | | |
| E/P/MAH | | 10 | | | | | | | | | | |
| E/GMA | | | 10 | | | | | | | | | |
| E/GMA/AS | | | | 10 | | | | | | | | |
| E/EEA/MAH | | | | | 10 | | | | | | 5 | 5 |
| E/EEA/GMA | | | | | | 10 | | | | | | |
| E/MMA/MAA | | | | | | | 10 | | | | | |
| E/MMA/MAA/Na | | | | | | | | 10 | | | | |
| E/MMA/MAA/Zn | | | | | | | | | 10 | | | |
| E/EEA | | | | | | | | | | 10 | 5 | |
| E/P | | | | | | | | | | | | 5 |
| P/MAH | | | | | | | | | | | | |
| PE | | | | | | | | | | | | |
| Evaluation | | | | | | | | | | | | |
| Test piece | | | | | | | | | | | | |
| Deflection temperature under load (° C.) | 190 | 183 | 183 | 185 | 181 | 185 | 192 | 190 | 190 | 192 | 187 | 187 |
| Flexural strain at break (%) | 4.8 | 5.1 | 5.9 | 6.0 | 5.2 | 5.1 | 6.2 | 4.7 | 4.6 | 4.7 | 5.3 | 5.0 |
| Box-shaped molded article | | | | | | | | | | | | |
| Appearance | A | A | A | A | A | A | A | A | A | A | A | A |
| Impact resistance | A | A | A | A | A | A | A | A | A | A | A | A |
| Heat resistance | A | A | A | A | A | A | A | A | A | A | A | A |

| | Example | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 |
| Polyester resin composition | | | | | | | | | | | | |
| PET I | 80 | 80 | 80 | 80 | 80 | 80 | 85 | 80 | 75 | | | 80 |
| PET II | | | | | | | | | | 85 | | |
| PET III | | | | | | | | | | | 85 | |
| Talc | 10 | 10 | 10 | 10 | 10 | 10 | 10 | 10 | 10 | 10 | 10 | 5 |
| Calcium carbonate | | | | | | | | | | | | |
| Wollastonite | | | | | | | | | | | | |
| Silica | | | | | | | | | | | | |
| Glass fiber | | | | | | | | | | | | 5 |
| Glass beads | | | | | | | | | | | | |
| E/MAH | | | | | | | | | | | | |
| E/P/MAH | | | | | | | | | | | | |
| E/GMA | | | 5 | | | | | | | | | |
| E/GMA/AS | | | | | | 5 | 2.5 | 5 | 7.5 | 10 | 10 | |
| E/EEA/MAH | | | | | | | | | | | | |
| E/EEA/GMA | | 5 | | | | | | | | | | 10 |
| E/MMA/MAA | 5 | | | | | | | | | | | |
| E/MMA/MAA/Na | | | | 5 | | | | | | | | |
| E/MMA/MAA/Zn | | | | | 5 | | | | | | | |
| E/EEA | | | | | | 5 | | | | | | |
| E/P | | | | 5 | | | 2.5 | 5 | 7.5 | | | |
| P/MAH | 5 | | | | 5 | | | | | | | |
| PE | | 5 | 5 | | | | | | | | | |
| Evaluation | | | | | | | | | | | | |
| Test piece | | | | | | | | | | | | |
| Deflection temperature under load (° C.) | 183 | 192 | 190 | 187 | 181 | 188 | 198 | 194 | 183 | 182 | 185 | 217 |
| Flexural strain at break (%) | 4.5 | 5.4 | 5.3 | 4.6 | 4.5 | 5.3 | 5.1 | 5.3 | 5.6 | 6.0 | 5.4 | 5.5 |

TABLE 1-continued

Box-shaped molded article

| | | | | | | | | | | | | |
|---|---|---|---|---|---|---|---|---|---|---|---|---|
| Appearance | A | A | A | A | A | A | A | A | A | A | A | A |
| Impact resistance | A | A | A | A | A | A | A | A | A | A | A | A |
| Heat resistance | A | A | A | A | A | A | A | A | A | A | A | A |

TABLE 2

| | Comparative Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Polyester resin composition | | | | | | | | | | | | |
| PET I | 80 | 80 | 80 | 80 | 80 | 80 | 80 | 80 | 79 | 79 | 60 | 80 |
| PET II | | | | | | | | | | | | |
| PET III | | | | | | | | | | | | |
| Talc | | | | | | 10 | 10 | 10 | 10 | 10 | 10 | 10 |
| Calcium carbonate | 10 | | | | | | | | | | | |
| Wollastonite | | 10 | | | | | | | | | | |
| Silica | | | 10 | | | | | | | | | |
| Glass fiber | | | | 10 | | | | | | | | |
| Glass beads | | | | | 10 | | | | | | | |
| E/MAH | | | | | | | | | | | | |
| E/P/MAH | | | | | | | | | | | | |
| E/GMA | | | | | | | | | | | | |
| E/GMA/AS | | | | | | | | | | | | |
| E/EEA/MAH | | | | | | | | | | | 30 | |
| E/EEA/GMA | 10 | 10 | 10 | 10 | 10 | | | | | 1 | | |
| E/MMA/MAA | | | | | | | | | | | | |
| E/MMA/MAA/Na | | | | | | | | | | | | |
| E/MMA/MAA/Zn | | | | | | | | | | | | |
| E/P | | | | | | | | | | | | 10 |
| ABS | | | | | | 10 | | | | | | |
| MBS | | | | | | | 10 | | | | | |
| SEBS | | | | | | | | 10 | | | | |
| TPU | | | | | | | | | 10 | | | |
| Evaluation | | | | | | | | | | | | |
| Test piece | | | | | | | | | | | | |
| Deflection temperature under load (° C.) | 122 | 135 | 124 | 218 | 135 | 168 | 164 | 171 | 159 | 194 | 163 | 166 |
| Flexural strain at break (%) | 5.8 | 6.1 | 5.5 | 3.6 | 5.9 | 2.9 | 2.7 | 3.3 | 3.3 | 3.1 | 8.3 | 3.2 |
| Box-shaped molded article | | | | | | | | | | | | |
| Appearance | A | A | A | C | A | C | B | B | C | A | B | B |
| Impact resistance | A | A | A | A | A | B | B | B | B | B | A | B |
| Heat resistance | B | B | B | A | B | B | B | A | B | A | B | B |

Examples 25–33 and Comparative Examples 13–14

Test pieces were prepared following the procedure of Example 1 with the exception of using the ingredients in the proportions (part by weight) of Examples and Comparative Examples shown in Table 3. The physical properties of the prepared test pieces were evaluated. The cylinder temperature of the injection molding machine during the production of the test pieces was set at 260–260–260° C. The results are shown in Table 3.

The methods for evaluating the physical properties are described below. The flexural strain at break and deflection temperature under load were determined by the same methods as in Examples 1–24.

1) Melt Flow Rate (MFR)

Melt flow rate was determined according to ASTM-D1238 by a melt indexer (manufactured by Toyo Seiki Seisaku-Sho, Ltd.) at 230° C. under a load of 21.2 N.

2) Cowling Product Test (i) Fluidity

Molding was carried out by using an injection molding machine with the clamping force of 1000 tons and the barrel temperature setting of 260–260–260° C. and a mold for cowling(400 mm×550 mm×80 mm, thickness: 2 mm) adjusted at 120° C. The molding cycle was 45 seconds. The fluidity of the resin composition was evaluated.

A: sufficiently filling the mold and good in appearance

B: short shot or defective appearance (ii) Drop Test

The cowlings obtained in the above (i) were dropped with their emblem sides (front sides) facing down from a height of 1 m to a steel plate placed on the floor of the testing room which was adjusted to a temperature of –30° C. and 50% RH. The dropped cowlings were checked for damage.

A: No breakage is found
B: Cracks, fracture and/or breakage are found (iii) Heat Resistance The cowlings obtained in the above (i) were heated at 130° C. for 300 hours, and then were checked for their appearances.

A: No noticeable deformation or discoloration is found
B: Noticeable deformation or discoloration is found
In the Tables, the following abbreviations are used:

PET: Polyethylene terephthalate (germanium catalyst, intrinsic viscosity: 0.70)

GF: Glass fiber (length: 3 mm)

PE copolymer I:
 Ethylene-propylene-glycidyl methacrylate copolymer (MFR: 3.0)

PE copolymer II:
 Ethylene-propylene modified with methacrylic acid (MFR: 1.8)

PE copolymer III:
 Ethylene-ethyl acrylate-methyl methacrylate (MFR: 22)

PP copolymer I:
 Polypropylene modified with maleic anhydride (MFR: 75)

PP copolymer II:
 Polypropylene modified with glycidyl methacrylate (MFR: 60)

PP copolymer III:
 Polypropylene modified with maleic anhydride (MFR: 30)

PP copolymer IV:
 Polypropylene modified with maleic anhydride (MFR: 9)

What is claimed is:

1. A polyester resin composition for engine peripheral parts, the resin composition comprising:
 (A) 60–92% by weight of at least one polymer selected from the group consisting of polyethylene terephthalate and an ethylene terephthalate copolymer;
 (B) 5–15% by weight of talc; and
 (C) 3–25% by weight of an olefin polymer,
wherein a molded article produced from the resin composition has a flexural strain at break of 3.5% or higher and a deflection temperature under load of 180° C. or higher.

2. A polyester resin composition for engine peripheral parts, the resin composition comprising:
 (A) 100 parts by weight of at least one polymer selected from the group consisting of polyethylene terephthalate and an ethylene terephthalate copolymer;
 (B) 5–70 parts by weight of an inorganic reinforcement material;
 (C) 2–20 parts by weight of an ethylene polymer having a melt flow rate of 5 or lower; and
 (D) 3–20 parts by weight of a propylene polymer having a melt flow rate of 5–100,
wherein a molded article produced from the resin composition has a flexural strain at break of 3.5% or higher and a deflection temperature under load of 180° C. or higher.

3. The polyester resin composition for engine peripheral parts according to claim 1, wherein at least one polymer selected from the group consisting of polyethylene terephthalate and an ethylene terephthalate copolymer contains germanium.

4. The polyester resin composition for engine peripheral parts according to claim 2, wherein at least one polymer selected from the group consisting of polyethylene terephthalate and an ethylene terephthalate copolymer contains germanium.

* * * * *

TABLE 3

|  | Example | | | | | | | | | Comparative Example | |
|---|---|---|---|---|---|---|---|---|---|---|---|
|  | 25 | 26 | 27 | 28 | 29 | 30 | 31 | 32 | 33 | 13 | 14 |
| PET | 100 | 100 | 100 | 100 | 100 | 100 | 100 | 100 | 100 | 100 | 100 |
| GF | 3 | 3 | 10 | 10 | 10 | 3 | 3 | 3 | 30 |  | 15 |
| Talc | 7 | 7 | 3 | 3 | 3 | 7 | 7 | 7 | 1 | 15 |  |
| PE copolymer I | 2 | 4 | 2 | 4 | 4 |  | 4 | 4 | 10 |  |  |
| PE copolymer II |  |  |  |  |  | 4 |  |  |  |  |  |
| PE copolymer III |  |  |  |  |  |  |  |  |  |  |  |
| PP copolymer I | 7.5 | 7.5 | 7.5 | 10 |  | 7.5 |  |  | 5 |  |  |
| PP copolymer II |  |  |  |  | 10 |  |  |  |  |  |  |
| PP copolymer III |  |  |  |  |  |  | 7.5 |  |  |  |  |
| PP copolymer IV |  |  |  |  |  |  |  | 7.5 |  |  |  |
| Test piece |  |  |  |  |  |  |  |  |  |  |  |
| Bending strength (MPa) | 103 | 105 | 127 | 123 | 118 | 102 | 106 | 108 | 152 | 90 | 130 |
| Flexural strain at break (%) | 4.4 | 4.7 | 3.9 | 4.2 | 4.9 | 4.2 | 4.6 | 4.9 | 3.8 | 2.7 | 2.1 |
| Deflection temperature under load (° C.) | 205 | 202 | 235 | 236 | 230 | 200 | 205 | 206 | 225 | 170 | 240 |
| Cowling product |  |  |  |  |  |  |  |  |  |  |  |
| Fluidity | A | A | A | A | A | A | A | A | A | B | B |
| Drop test | A | A | A | A | A | A | A | A | A | B | A |
| Heat resistance | A | A | A | A | A | A | A | A | A | B | A |